US009929393B2

(12) United States Patent
Shiu et al.

(10) Patent No.: US 9,929,393 B2
(45) Date of Patent: Mar. 27, 2018

(54) WOUND BATTERY CELLS WITH NOTCHES ACCOMMODATING ELECTRODE CONNECTIONS

(71) Applicant: Apple Inc., Cupertino, CA (US)

(72) Inventors: Brian K. Shiu, Sunnyvale, CA (US); Qingcheng Zeng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 14/991,686

(22) Filed: Jan. 8, 2016

(65) Prior Publication Data

US 2017/0092925 A1    Mar. 30, 2017

Related U.S. Application Data

(60) Provisional application No. 62/235,060, filed on Sep. 30, 2015.

(51) Int. Cl.
*H01M 2/26* (2006.01)
*H01M 10/04* (2006.01)

(52) U.S. Cl.
CPC ....... *H01M 2/263* (2013.01); *H01M 10/0431* (2013.01); *H01M 2220/30* (2013.01)

(58) Field of Classification Search
CPC ............. H01M 2/263; H01M 10/0431; H01M 2004/025
See application file for complete search history.

(56) References Cited

U.S. PATENT DOCUMENTS

| 5,478,668 A | 12/1995 | Gozdz et al. |
| 5,910,382 A | 6/1999 | Goodenough et al. |
| 5,916,707 A | 6/1999 | Omaru et al. |
| 6,040,078 A | 3/2000 | Fauteux et al. |
| 6,224,995 B1 | 5/2001 | Fauteux et al. |
| 6,432,574 B1 | 8/2002 | Suzuki et al. |
| 6,991,873 B2 | 1/2006 | Sakai et al. |
| 7,092,746 B2 | 8/2006 | Infanti |
| 7,364,817 B2 * | 4/2008 | Lee ........................ H01M 2/266 429/161 |

(Continued)

FOREIGN PATENT DOCUMENTS

| CN | 1314008 | 9/2001 |
| CN | 1508899 | 6/2004 |

(Continued)

*Primary Examiner* — Ula C Ruddock
*Assistant Examiner* — Amanda Barrow
(74) *Attorney, Agent, or Firm* — Polsinelli PC

(57) ABSTRACT

The disclosed embodiments relate to the design of a jelly-roll battery comprising an alternating anode and cathode layers coated with intervening separator layers wound into a jelly-roll. The alternating anode and cathode layers are coated with, respectively, an anode active coating and a cathode active coating. A first common notch and a second common notch are formed along at least one side of the jelly-roll. A common cathode tab can be bonded to the cathode tabs within the first common notch, and a common anode tab can be bonded to the anode tabs within the second common notch. The jelly-roll battery also includes a pouch enclosing the jelly-roll. Common anode and cathode tabs can extend through the pouch to provide cathode and anode terminals for the battery cell.

21 Claims, 15 Drawing Sheets

(56) References Cited

U.S. PATENT DOCUMENTS

| | | | |
|---|---|---|---|
| 7,432,018 B2 * | 10/2008 | Taguchi | H01M 4/242 |
| | | | 429/233 |
| 8,440,938 B2 | 5/2013 | Chami et al. | |
| 8,592,065 B2 | 11/2013 | Bhardwaj et al. | |
| 9,276,287 B2 | 3/2016 | Bhardwaj et al. | |
| 2001/0005561 A1 | 6/2001 | Yamada et al. | |
| 2001/0019795 A1 | 9/2001 | Yoshida et al. | |
| 2002/0157242 A1 | 10/2002 | Fukuda et al. | |
| 2003/0077509 A1 | 4/2003 | Probst et al. | |
| 2003/0148173 A1 | 8/2003 | Gu | |
| 2003/0232236 A1 | 12/2003 | Mitchell et al. | |
| 2004/0119442 A1 | 6/2004 | Lee et al. | |
| 2004/0127952 A1 | 7/2004 | O'Phelan et al. | |
| 2005/0188533 A1 | 9/2005 | Righi et al. | |
| 2005/0272479 A1 | 12/2005 | Infanti | |
| 2006/0024572 A1 | 2/2006 | Lee | |
| 2006/0105237 A1 | 5/2006 | Oh | |
| 2006/0127762 A1 * | 6/2006 | Gyenes | H01M 2/18 |
| | | | 429/209 |
| 2006/0154145 A1 | 7/2006 | Lee et al. | |
| 2006/0210872 A1 | 9/2006 | Yageta et al. | |
| 2007/0031733 A1 | 2/2007 | Kogetsu et al. | |
| 2007/0105014 A1 | 5/2007 | Shin et al. | |
| 2007/0231683 A1 | 10/2007 | Lee et al. | |
| 2008/0248386 A1 | 10/2008 | Obrovac | |
| 2009/0029246 A1 | 1/2009 | Kim | |
| 2009/0095808 A1 | 4/2009 | Naccache | |
| 2009/0117462 A1 | 5/2009 | Okazaki et al. | |
| 2009/0197162 A1 | 8/2009 | Shinyashiki et al. | |
| 2009/0202908 A1 | 8/2009 | Sumihara et al. | |
| 2009/0239133 A1 | 9/2009 | Chinichiro | |
| 2009/0248356 A1 | 10/2009 | Kriegmair | |
| 2010/0047685 A1 | 2/2010 | Lee et al. | |
| 2010/0167111 A1 | 7/2010 | Sumihara et al. | |
| 2011/0064991 A1 * | 3/2011 | Ahn | H01M 2/021 |
| | | | 429/153 |
| 2011/0123844 A1 | 5/2011 | Bhardwaj et al. | |
| 2011/0183183 A1 | 7/2011 | Grady et al. | |
| 2012/0015223 A1 | 1/2012 | Bhardwaj et al. | |
| 2012/0015236 A1 | 1/2012 | Spare | |
| 2012/0107654 A1 | 3/2012 | Bharwaj et al. | |
| 2012/0121965 A1 | 5/2012 | Makino et al. | |
| 2012/0177953 A1 | 7/2012 | Bhardwaj et al. | |
| 2013/0252053 A1 | 9/2013 | Woo | |
| 2013/0302674 A1 | 11/2013 | Stern et al. | |
| 2014/0065457 A1 | 3/2014 | Bhardwaj et al. | |
| 2014/0113184 A1 * | 4/2014 | Hamel | H01M 10/0436 |
| | | | 429/179 |
| 2014/0170467 A1 | 6/2014 | Kwon et al. | |
| 2014/0322575 A1 | 10/2014 | Hwang et al. | |
| 2015/0207111 A1 * | 7/2015 | Tao | H01M 10/0525 |
| | | | 429/162 |
| 2016/0013455 A1 * | 1/2016 | Shiu | H01M 2/021 |
| | | | 361/679.26 |

FOREIGN PATENT DOCUMENTS

| | | | | |
|---|---|---|---|---|
| CN | 1599099 | 3/2005 | | |
| CN | 1780036 | 5/2006 | | |
| CN | 1808753 | 7/2006 | | |
| CN | 201038228 | 3/2008 | | |
| CN | 100461505 | 2/2009 | | |
| CN | 101411005 | 4/2009 | | |
| CN | 101523656 | 9/2009 | | |
| CN | 101542817 | 9/2009 | | |
| CN | 102237508 | 11/2011 | | |
| CN | 102340021 | 2/2012 | | |
| CN | 102881914 | 1/2013 | | |
| EP | 1102336 | 5/2001 | | |
| EP | 1195838 | 4/2002 | | |
| EP | 1569252 | 8/2005 | | |
| EP | 1895610 | 3/2008 | | |
| EP | 2325929 | 5/2011 | | |
| EP | 2654102 | 10/2013 | | |
| JP | 63-33543 | 12/1994 | | |
| JP | 1997-82361 | 3/1997 | | |
| JP | H09-259859 | * | 10/1997 | H01M 2/30 |
| JP | 2000-021453 | 1/2000 | | |
| JP | 2000-285881 | 10/2000 | | |
| JP | 2001-028275 | 1/2001 | | |
| JP | 2001-167743 | 6/2001 | | |
| JP | 2001-273930 | 10/2001 | | |
| JP | 2003-234094 | 8/2003 | | |
| JP | 2004-111219 | 4/2004 | | |
| JP | 2005-011660 | 1/2005 | | |
| JP | 2005-228573 | 8/2005 | | |
| JP | 2008-066089 | 3/2008 | | |
| JP | 2008-123955 | 5/2008 | | |
| JP | 2009-152204 | 7/2009 | | |
| JP | 2012-018795 | * | 1/2012 | H01M 2/26 |
| JP | 2013-62137 | 4/2013 | | |
| JP | 2013-062137 | * | 4/2013 | H01M 10/04 |
| JP | 2013-098080 | 5/2013 | | |
| KR | 2003-0066960 | 8/2003 | | |
| KR | 10-2006-28184 | 3/2006 | | |
| KR | 2007-0096280 | 10/2007 | | |
| KR | 100883922 | 10/2007 | | |
| KR | 2008-0019311 | 3/2008 | | |
| KR | 100905390 | 3/2008 | | |
| KR | 10-2009-0045365 | 5/2009 | | |
| KR | 10-2014-0015647 | 2/2014 | | |
| TW | I260101 | 8/2006 | | |
| TW | I283941 | 7/2007 | | |
| TW | M332265 | 5/2008 | | |
| TW | M341313 | 9/2008 | | |
| TW | M363159 | 8/2009 | | |
| TW | 201230439 | 7/2012 | | |
| TW | 201230447 | 7/2012 | | |
| TW | 201230457 | 7/2012 | | |
| TW | 201232877 | 8/2012 | | |
| WO | WO 2005/074057 | 11/2005 | | |
| WO | WO 2005/117189 | 12/2005 | | |
| WO | WO 2010/022669 | 4/2010 | | |
| WO | WO 2011/092486 | 8/2011 | | |
| WO | WO 2011/115464 | 9/2011 | | |
| WO | WO 2012/009423 | 1/2012 | | |
| WO | WO 2012/060972 | 5/2012 | | |
| WO | WO 2012/086793 | 6/2012 | | |
| WO | WO 2013/062661 | 5/2013 | | |

* cited by examiner

WOUND BATTERY CELLS WITH NOTCHES ACCOMMODATING ELECTRODE CONNECTIONS

FIELD

The disclosed embodiments generally relate to batteries for portable electronic devices. More specifically, the disclosed embodiments relate to the design of a jelly-roll battery cell that includes notches to accommodate connections to electrode tabs that extend from the battery cell.

BACKGROUND

Rechargeable batteries are presently used to provide power to a wide variety of portable electronic devices, including laptop computers, tablet computers, smartphones, and digital music players. Jelly-roll battery designs, also referred to herein as wound battery designs, are used in several such battery designs. Jelly-roll battery cells include alternating anode and cathode layers covered with active material with intervening separator layers. These layers are then wound into a "jelly-roll" configuration.

Jelly-roll battery cells typically include conductive tabs that are coupled to the anodes and cathodes and extend beyond the outer perimeter of the battery cells to provide power to circuitry within the portable electronic device. Unfortunately, connections to these conductive tabs add to the overall profile of a battery cell, which results in wasted space (e.g., space not used by the energy-producing portions of the battery), and thereby decreases the effective energy density of the battery cell.

Hence, what is needed is a jelly-roll battery design that reduces the wasted space caused by connections to conductive tabs that provide power to external circuitry.

SUMMARY

In some aspects, the disclosure is directed to a battery cell comprising a jelly-roll. The jelly-roll comprises wound together layers including a cathode layer, an anode layer, and separator layers disposed between each cathode layer and anode layer. A first common notch and a second common notch are formed along at least one side of the jelly-roll. An uncoated cathode tab extends from at least one cathode layer in the first common notch, and an uncoated anode tab extends from at least one anode layer in the second common notch. A common cathode tab is bonded to each uncoated cathode tab within the first common notch, and a common anode tab bonded to each uncoated anode tab within the second common notch.

In a further aspect, the disclosure is directed to methods of manufacturing a battery cell. Pairs of notches are cut into an anode layer, cathode layer, and one or more separator layers. Active material on the cathode layer and the anode layer is ablated from regions associated with a cathode tab and the anode tab. The cathode layer, anode layer, and separator layers are rolled to form a jelly-roll that includes a first common notch and a second common notch.

In a further aspect, the disclosure is directed to portable computing devices having a processor, memory, display, and a battery cell as described herein.

In some embodiments, the common anode tab is bonded to the uncoated anode tabs by folding the uncoated anode tabs; bonding the folded uncoated anode tabs together; and bonding the common anode tab to the folded-and-bonded uncoated anode tabs.

In some embodiments, the first and second common notches are formed on a same side of the battery cell.

In some embodiments, the first and second common notches are formed on opposite sides of the battery cell.

BRIEF DESCRIPTION OF THE FIGURES

FIG. 7A presents a side view of a jelly-roll, according to an illustrative embodiment.

FIG. 7B illustrates portions of the cathode layer and the anode layer of FIG. 7A, but prior to winding into the jelly-roll.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Jelly-Roll Battery Cell

Figure 1A:
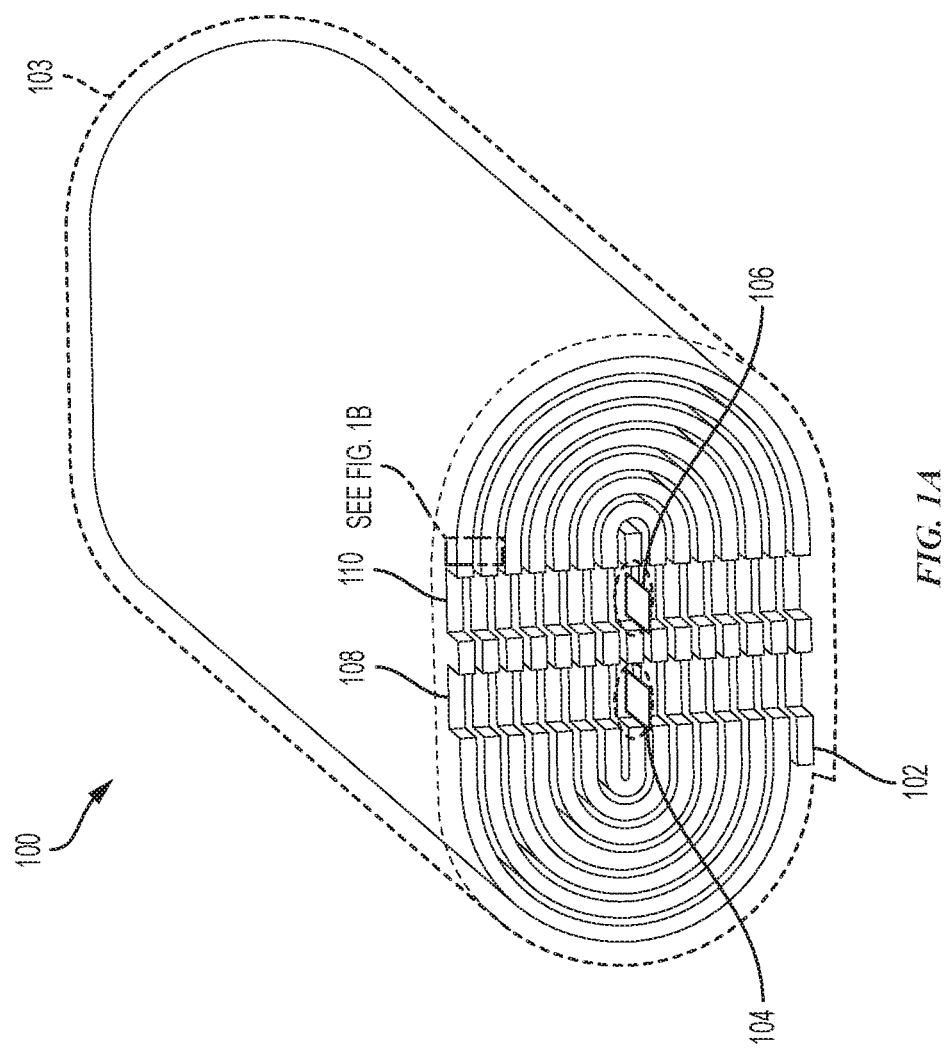
FIG. 1A illustrates a jelly-roll battery cell in accordance with the disclosed embodiments.

FIG. 1A illustrates a jelly-roll battery cell 100 in accordance with the disclosed embodiments. The jelly-roll battery cell 100 may include a lithium-polymer or other suitable cell that supplies power to an electronic device, such as a laptop computer, mobile phone, tablet computer, portable media player, digital camera, or other type of battery-powered electronic device. Combinations of devices may also be powered by the jelly-roll battery cell 100.

As shown in FIG. 1A, the jelly-roll battery cell 100 includes a jelly-roll 102 with a wound configuration. In FIG. 1A, the jelly-roll battery cell 100 is depicted as having an oblong cross-section. This depiction, however, is for purposes of illustration only and is not intended as limiting. The jelly-roll 102 may exhibit a spiral (or cylindrical) cross-section, an elliptical cross-section, an oblong cross-section, or some other cross-section resulting from assembly of the jelly-roll battery cell 100.

The jelly-roll 102 includes a cathode electrode having a cathode current collector with a cathode active coating (referred to as a "cathode layer"), a separator (referred to as a "separator layer"), and an anode electrode having an anode current collector with an anode active coating (referred to as an "anode layer"). For example, an adjacent set of layers within the jelly-roll 102 may include one cathode layer (e.g., aluminum foil coated with a lithium compound) and one anode layer (e.g., copper foil coated with carbon) separated by one separator material (e.g., conducting polymer, which may house or otherwise act as an electrolyte).

In general, however, the jelly-roll 102 includes an alternating sequence of cathode layers and anode layers with separator layers interposed in between. The sequence within the jelly-roll 102 can include any number of cathode layers, anode layers, and separator layers. Moreover, the sequence may start and terminate with any one of the cathode layer, the anode layer, or the separator layer. For example, and without limitation, the sequence may include the anode layer, a first separator layer, the cathode layer, and a second separator layer. The sequence may be wound into a jelly roll such that the first separator layer resides in a first interface between the cathode active coating and the anode active coating and the second separator layer resides in a second layer interface between the cathode current collector and the anode current collector.

Properties of the separator layers may vary in accordance with an interface in which they reside. For example, and without limitation, separator layers between active coatings (e.g., the first separator layer) may be electrically-insulating and ionically-conductive. And separator layers between current collectors (e.g., the second separator layer) may be electrically-insulating and not ionically-conductive. Other material properties and their combinations are possible for the separator layers.

After the jelly-roll 102 is formed into the wound configuration, the jelly-roll 102 may be enclosed in a battery housing 103 (e.g., a pouch), and a set of conductive tabs 104, 106 may be extended through seals in the battery housing (for example, formed using sealing tape) to provide terminals for the battery cell. For example, a first conductive tab 104 may be coupled to the cathode layers (e.g., may be coupled to one or more portions of the cathode current collector), and a second conductive tab 106 may be coupled to the anode layers (e.g., may be coupled to one or more portions of the cathode current collector). The conductive tabs 104, 106 may be used to electrically couple the jelly-roll battery cell 100 with one or more other battery cells to form a battery pack, or may electrically couple the jelly-roll battery cell 100 directly to the electronic device to provide power to that device. The conductive tabs 104, 106 may further be coupled to other battery cells in a series, parallel, or series-and-parallel configuration to form the battery pack. The coupled cells may be enclosed in a hard case to complete the battery pack, or the coupled cells may be embedded within the enclosure of a portable electronic device.

One problem with conventional battery designs is that the connections between the anode and cathode layers and conductive tabs take up additional space beyond the outer perimeter of layers within the jelly-roll. This additional space is required to bond the electrode layers (e.g., the anode layer, the cathode layer) to conductive tabs, which may involve connecting individual electrode layers together and bonding the electrode layers to a common conductive tab that provides a terminal for the battery cell. The space taken up by these connections can limit how close the battery housing can be to the sides of the cathode and anode layers. This problem can be remedied by including one or more common notches 108, 110 within the jelly-roll battery cell 100 to accommodate the conductive tabs 104, 106 as is described in more detail below.

Figure 1B:
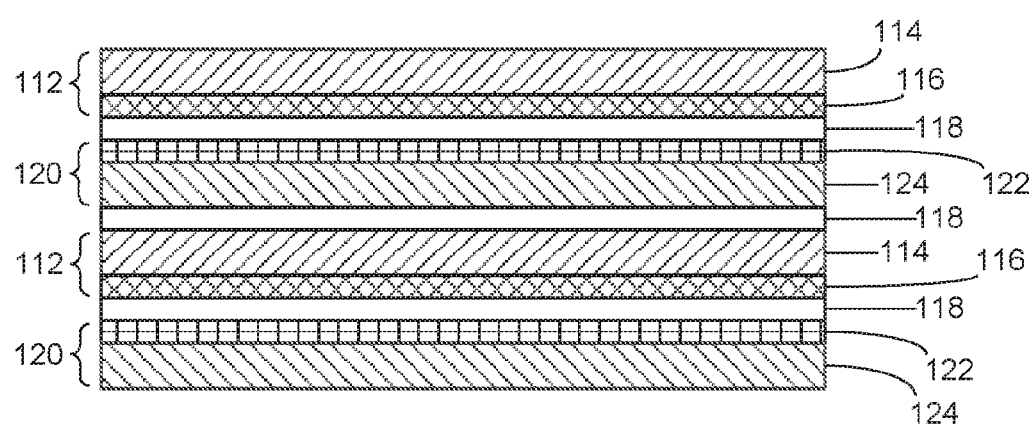
FIG. 1B provides a detail view of layers of the jelly-roll battery cell depicted in FIG. 1A.

FIG. 1B provides a detail view of layers of the jelly-roll 102 depicted in FIG. 1A, in accordance with the disclosed embodiments. The jelly-roll 102 may include a cathode layer 112 having a cathode current collector 114 and a cathode active coating 116. The jelly-roll 102 may also include an anode layer 120 having an anode active coating 122 and an anode current collector 124. A separator 118 may be disposed between the cathode layer 112 and anode layer 120. The jelly-roll 102 can be wound into a battery cell, such as that depicted in FIG. 1A.

The layers 112, 120 in the jelly-roll 102 may be formed from any suitable material or materials. For example, in some embodiments, the cathode current collector 114 may be a metal foil (e.g., an aluminum foil); the cathode active coating 116 may be a lithium compound (e.g., $LiCoO_2$, $LiNiCoMnO_2$, $LiCoAlO_2$, $LiMn_2O_4$, etc.) or another suitable cathode active material; the anode current collector 124 may be a metal foil (e.g., a copper foil); the anode active coating 122 may be carbon, silicon, or another suitable anode active material; and the separator 118 may include a polymeric material such as polypropylene and/or polyethylene.

The separator 118 may additionally be a coated separator that includes a micro-alumina ($Al_2O_3$) and/or other ceramic coating, which can be single-sided or double-sided. This alumina coating is advantageous because it provides the mechanical ruggedness of the alumina, which is about as tough as constituent particles of cathode active coating 116. Moreover, the additional ruggedness provided by the alumina layer may prevent these constituent particles from working their way through separator 118, which can potentially cause a shunt. As a result, the ceramic coating may promote temperature stability in the jelly-roll battery cell 100 and can mitigate faults caused by mechanical stress, penetration, puncture, and/or electrical shorts.

The jelly roll 102 may also include an electrolyte comprising at least one solvated lithium species. The at least one solvated lithium species may include a lithium salt. Non-limiting examples of the lithium salt include $LiPF_6$, $LiBF_4$, $LiClO_4$, $LiSO_3CF_3$, $LiN(SO_2CF_3)_2$, $LiBC_4O_8$, $Li[PF_3(C_2CF_5)_3]$, and $LiC(SO_2CF_3)_3$. Other lithium salts are possible, including combinations of lithium salts. The electrolyte 136 may include a liquid solvent. In some instances, the liquid solvent may be an organic carbonate (e.g., ethylene carbonate, dimethyl carbonate, diethyl carbonate, ethylmethyl carbonate, etc.), an ionic liquid (e.g., 1-butyl-3-methylimidazolium hexafluorophosphate, 1-ethylpyridinium tetrafluoroborate, etc.), or some combination thereof. Other liquid solvents and their combinations are possible. In some instances, the electrolyte includes a gel polymer. In these instances, the gel polymer may include polymeric hosts such as polyethylene oxide (PEO), polyacrylonitrile (PAN), polymethylmethacrylate (PMMA), and polyvinylidene fluoride (PVdF). Other gel polymers are possible.

The electrolyte may be disposed between the cathode active coating 116 and the anode active coating 122, which includes permeation through the separator 118. Such permeation may include permeation into the cathode active coating 116 and the anode active coating 122. During operation of the jelly roll 102, the electrolyte serves as a medium through which lithium ions are exchanged between the cathode active coating 116 and the anode active coating 122.

Jelly-Roll Battery with Notches for Electrode Connections

Figure 2:
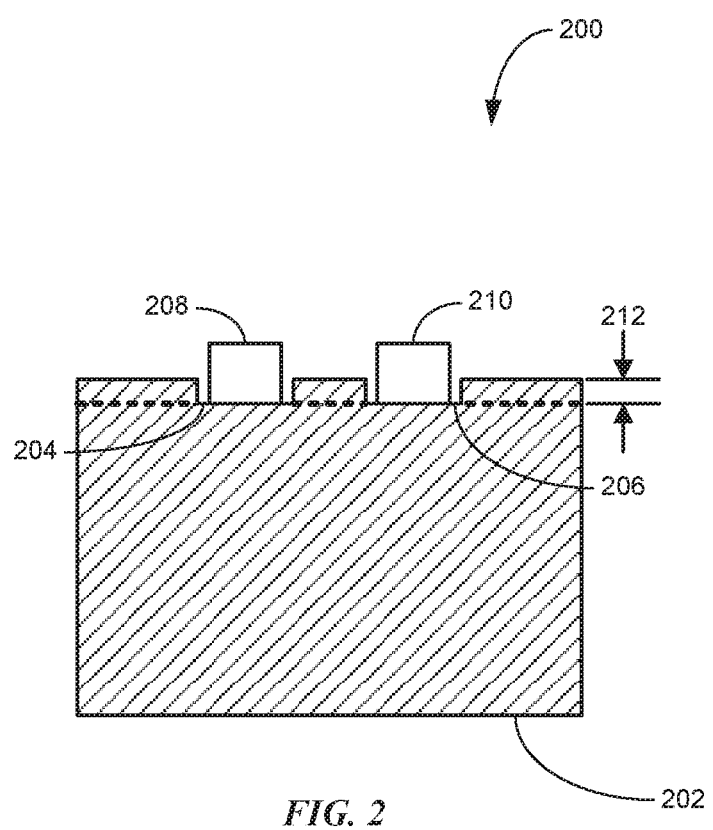
FIG. 2 presents a top view of a jelly-roll battery cell in a wound configuration, according to an illustrative embodiment.

As mentioned above, the jelly-roll battery cell 100 in FIG. 1A includes one or more common notches 108, 110 to facilitate bonding of the cathode layers 112 and the anode layers 120 to battery terminals in a space-efficient manner. In some embodiments, the one or more common notches 108, 110 may be formed into the cathode layers, anode layers, and separator layers prior to assembly of the jelly-roll. FIG. 2 illustrates a top view of a jelly-roll battery cell 200 in a wound configuration, according to an illustrative embodiment. The jelly-roll battery cell 200 includes wound electrode layers 202. The wound electrode layers 202 include one or more cathode layers, each having a cathode current collector with a cathode active coating, and one or more anode layers, each having an anode current collector with an anode active coating. A separator layer is interposed between adjacent cathode and anode layers.

In some instances, the wound electrode layers 202 include a single cathode layer and a single anode layer. A first separator layer is disposed between the single cathode layer and the single anode layer to separate the cathode active coating from the anode active coating. A second separator layer may be disposed along the single cathode layer, the single anode layer, or both. When in the wound configuration, the second separator layer separates the cathode current collector from the anode current collector. The cathode layer, the first separator layer, the anode layer, and the second separator layer are wound together to form the wound electrode layers 202. In other instances, the wound electrode layers 202 include multiple cathode layers and anode layers. A first separator layer is separates the cathode active coatings of the cathode layers from the anode active coatings of the anode layers. A second separator layer separates the cathode current collectors of the cathode layers from the anode current collectors of the anode layers. The multiple cathode layers and anode layer are wound together with corresponding first separator layers and second separator layers to form a jelly-roll configuration.

Individual cathode notches and individual anode notches are formed along edges of the cathode layers, the anode layers, and the separator layers. In FIG. 2, the individual cathode notches and the individual anode notches are disposed on a same side of the jelly-roll. It will be appreciated that these individual notches are spaced along the edges such that, when the electrode layers 202 are wound, instances of the individual cathode notch and the individual anode notch align to define, respectively, a common cathode notch 204 (i.e., a first common notch) and a common anode notch 206 (i.e., the second common notch). Thus, the individual cathode notches and the individual anode notches correspond to notches in, respectively, individual cathode layers and individual anode layers, whereas the common cathode notch 204 (i.e., the first common notch) and the common anode notch 206 (i.e., the second common notch) correspond to notches of the jelly-roll battery cell 200. The common cathode notch 204 is configured to accommodate cathode tabs 208 and the common anode notch 206 is configured to accommodate anode tabs 210.

Individual cathode layers may include one or more uncoated cathode tabs 208 that extend from the cathode current collector into the common cathode notch 204. Similarly, individual anode layers may include one or more uncoated anode tabs 210 that extend from the anode current collector into anode notch 206. By providing the common cathode notch 204 and the common anode notch 206, space is made for connections to the electrode layers, which allows the cathode layer to include an additional amount of cathode active coating and the anode layer to include an additional amount of anode active material. These additional amounts effectively increase the energy density of the jelly-roll battery cell 200.

Bonding Electrode Tabs

As mentioned above, the additional space provided by common notches 108, 110 in FIG. 1A can be used to make connections between the individual electrode layers and the common tabs (e.g., a common cathode tab connected to the cathode layer and a common anode tab connected to the anode layer) that serve as battery terminals. Conventional jelly-roll batteries have a single connection point between the cathode or anode current collector and the respective battery tab/terminal that extends from the battery housing (e.g., housing or pouch). By providing additional connection points along the length of the current collector, the impedance of the battery tab/terminal may decrease.

Figure 3A:
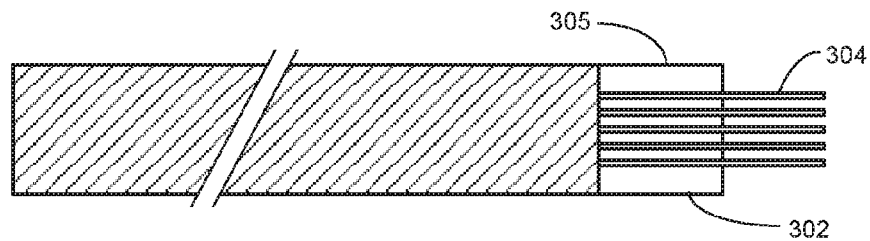
FIGS. 3A-3D illustrate how electrode tabs are folded and bonded to a common electrode tab in accordance with the disclosed embodiments.

FIGS. 3A-3E illustrate a process by which a battery tab can extend from different layers of a jelly-roll battery. The process starts after the various electrode and separator layers have been assembled into a jelly-roll 302 as is illustrated in FIG. 3A. FIG. 3A provides a cross-sectional view of jelly-roll 302 that includes a common notch 305, wherein electrode tabs 304 extend from jelly-roll 302 through the notch common 305.

Figure 3B:
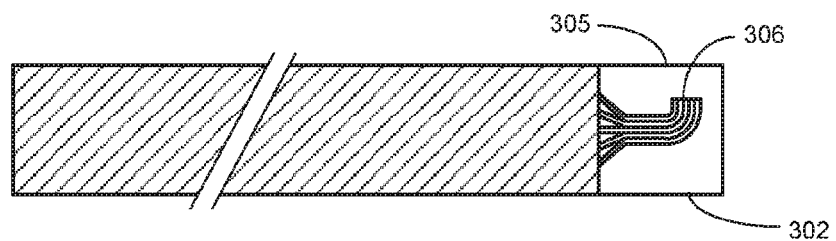
Figure 3C:
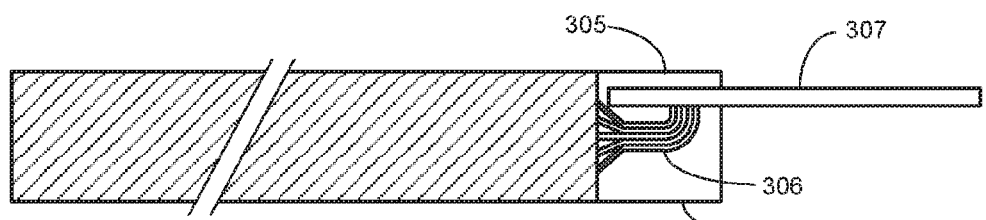
Figure 3D:
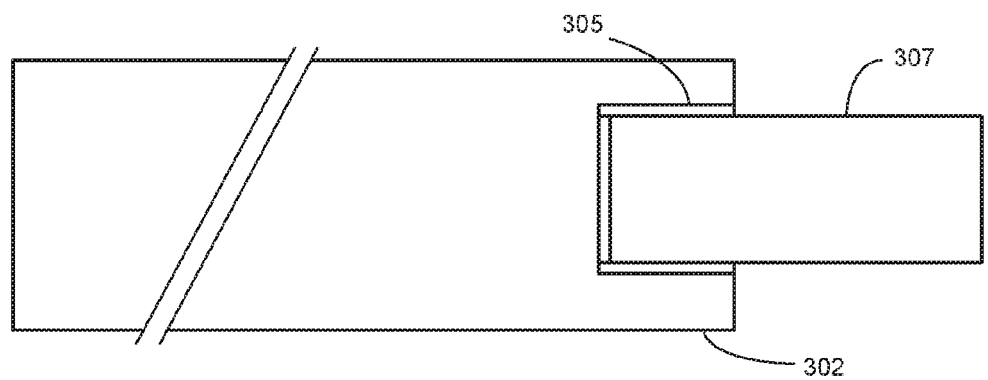

The common notch 305 may be either a common cathode notch or a common anode notch, and electrode tabs 304 correspond to either cathode tabs or anode tabs. The first two manufacturing steps involve folding and bonding electrode tabs 304 to produce folded-and-bonded electrode tabs 306 as is illustrated in FIG. 3B. Next, a common tab 307, which can be either a common cathode tab or a common anode tab, is bonded to folded-and-bonded electrode tabs 306. The common tab 307 extends from the battery cell to provide a positive or negative terminal for the battery cell as is illustrated in FIG. 3C. (FIG. 3D provides a corresponding top view of the configuration illustrated in FIG. 3C.) In some embodiments, the common tab 307 may be connected to the electrode tabs 306 within the notch 305 and may extend out of the notch 305. The connection between the electrode tabs 304 and the common tab 307 may take place entirely within the notch, partially within the notch, or outside the notch. The common tab 307 may extend out of the battery housing to different locations with a housing of an electronic device, or to different locations within a battery enclosure (e.g., in an instances where multiple batteries are housed and/or connected within a common battery enclosure).

Although the notches are formed in one or more sides of the electrode, the battery housing (and thus the overall battery cell) may not include notches corresponding to the notches of the electrode. Indeed, by connecting the electrode tabs at least partially within the notches (and thereby at least partially filling the notches), the battery housing may follow the overall profile of the electrodes, and may do so with a reduced footprint relative to batteries in which the cathode and/or anode tabs extend from an outer perimeter of the electrode.

Figure 3E:
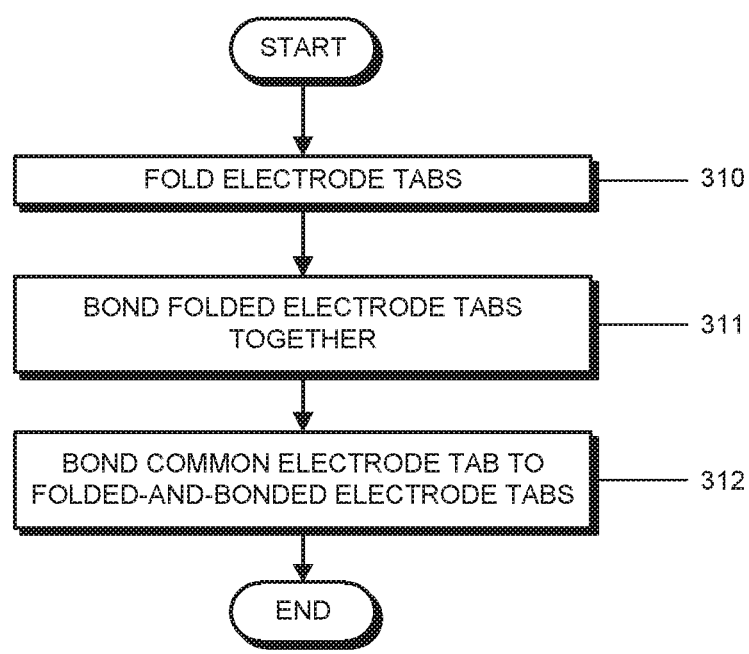
FIG. 3E presents a flow chart illustrating the process of folding and bonding electrode tabs to a common electrode tab in accordance with the disclosed embodiments.

FIG. 3E presents a flow chart illustrating the process of folding and bonding electrode tabs to a common electrode tab in accordance with the disclosed embodiments. First, the electrode tabs are folded (step 310). Next, the folded electrode tabs are bonded together, for example through ultrasonic welding (step 311). Finally, the folded-and-bonded electrode tabs are bonded to the common electrode tab (step 312). Please note that the above-listed sequence of steps are described as taking place in a specific order. However, these steps can alternatively be performed in other possible orderings.

Although FIGS. 3A-3E illustrate a specific technique for connecting the electrode tabs to a common electrode tab within a notch, the disclosed embodiments are not meant to be limited to this specific technique. In general, any effective technique can be used to connect the electrode tabs to the common tab within the notch. Moreover, in some cases, portions of the connection may extend outside of the notch.

Locations for Notches

Figure 4A:
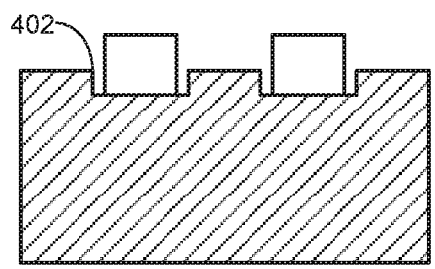
FIGS. 4A-4B illustrate a number of possible locations for electrode notches in accordance with the disclosed embodiments.
Figure 4B:
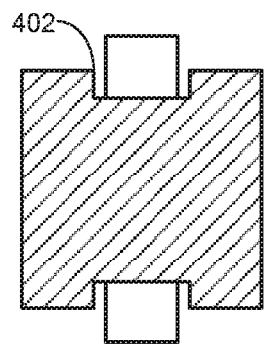

FIGS. 4A-4B illustrate a number of possible locations for electrode notches in accordance with the disclosed embodiments. As illustrated in FIG. 4A, the notches can include a "contained notch" 402 that is contained within a side of the battery cell. FIG. 4A illustrates the notches positioned on a same side of the battery cell. Notches can also be positioned on opposite sides of a jelly-roll battery cell. FIG. 4B illustrates the case of two contained notches on opposite sides of a battery cell. In FIG. 4B, the notches are depicted as aligned (i.e., immediately opposite each other). However, this depiction is not intended as limiting. For example, and without limitation, the notches may be position on opposite sides of the battery cell, but staggered relative to each other (i.e., an asymmetric arrangement).

Holes for Electrode Tabs

Figure 5A:
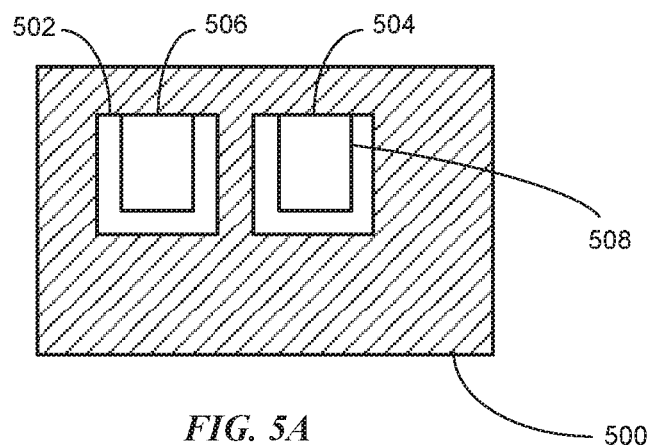
FIGS. 5A-5B illustrate how electrode notches can take the form of a hole through an interior region of a jelly-roll battery cell in accordance with the disclosed embodiments.
Figure 5B:
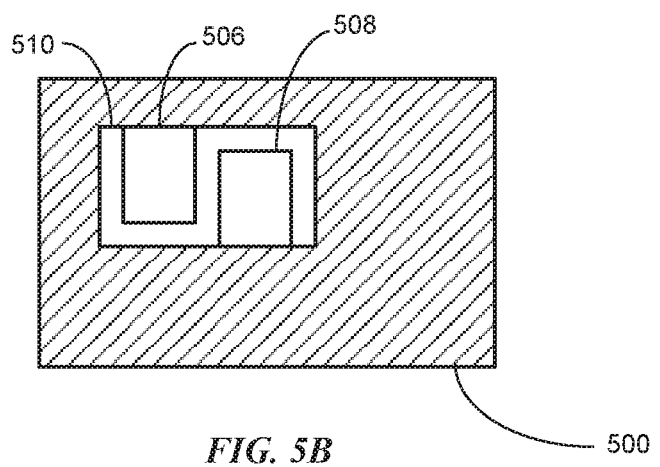

FIGS. 5A-5B illustrate variations in which one or more of the common notches is replaced by a hole through an interior region of the jelly-roll battery cell. More specifically, FIG. 5A illustrates electrodes 500 in a wound configuration that includes two through-holes 502, 504. A cathode through-hole 502 includes an uncoated cathode tab 506, and an anode through-hole 504 includes an uncoated anode tab 508. The through-holes 502, 504 exist to allow tabs 506, 508 within each respective through-hole to connect with each other, which may include multiple instances of the cathode tab 506 and the anode tab 508. Note that the jelly-roll battery cell can be formed by stacking alternating cathode and anode layers with intervening separator layers and rolling this stack into the wound configuration. The cathode layers are then connected with each other through one hole 502 (i.e., via the cathode tabs 506), and the anode electrodes are connected with each other through the other hole 504 (i.e., via the anode tabs 508).

Electrode Manufacturing Techniques

The above-described wound electrodes with notches and conductive tabs can be manufactured using a number of different techniques.

Figure 6:
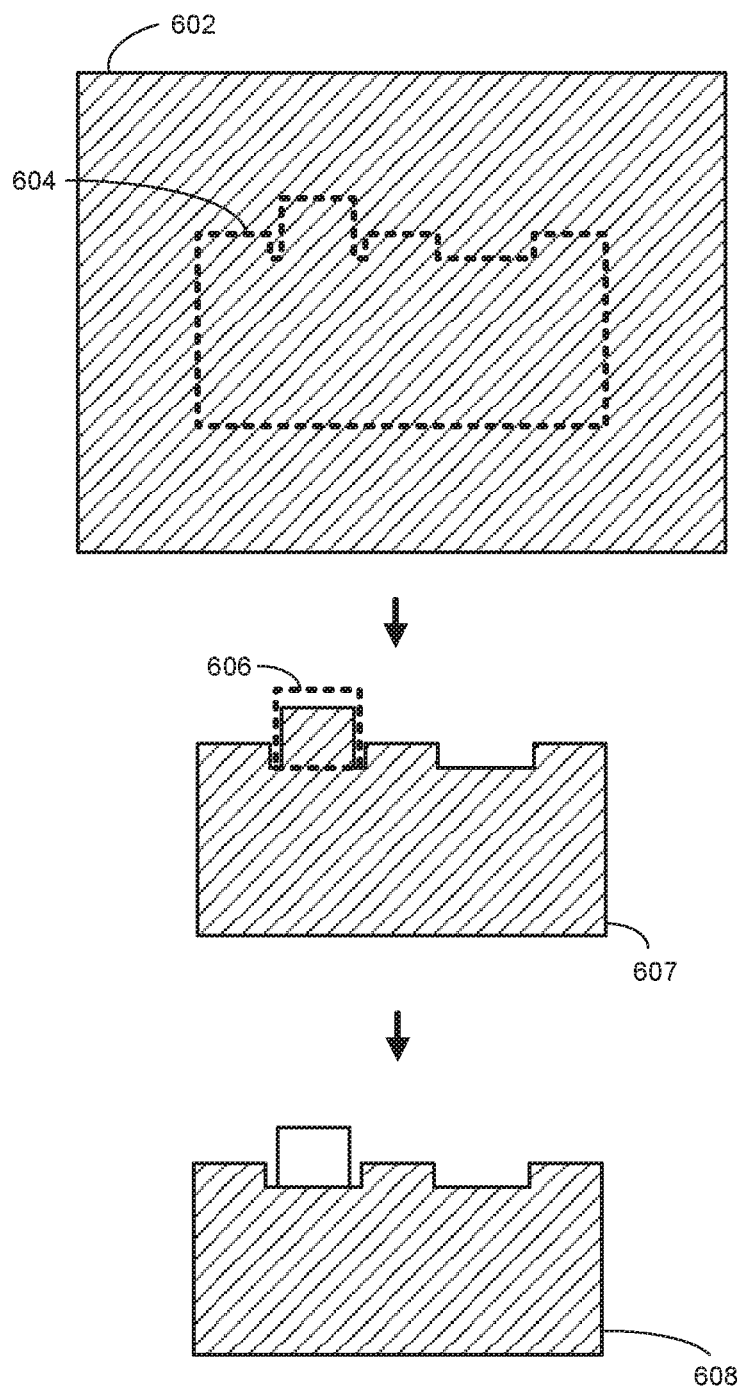
FIG. 6 illustrates a technique for manufacturing a cathode layer in accordance with the disclosed embodiments.

The above-described cathode and anode layers that are wound into a jelly-roll can be manufactured using a number of different techniques. FIG. 6 illustrates how a portion of a cathode layer or an anode layer can be formed. A sheet of electrode material is coated with an active material 602 (i.e., a cathode active coating or an anode active coating). A cutting operation 604 is performed based on an outline for the layer (i.e., a cathode layer or an anode layer) illustrated by the dotted line at the top of FIG. 6. Cutting operations can involve using a laser-based cutting technique, plasma cutting technique, or other cutting technique. The cutting operation produces an intermediate layer 607, which may include a tab. Next, an ablation operation 606 is performed on the intermediate layer 607 to remove the active coating from the tab. The ablation operation 606 produces layer 608 with an uncoated tab. Note that the ablation operation 606 can alternatively be performed before cutting operation 604 takes place. In variations of the disclosure, cutting operations are directed toward manufacturing cathode and anode layers including notches, as described herein.

Figure 7A:
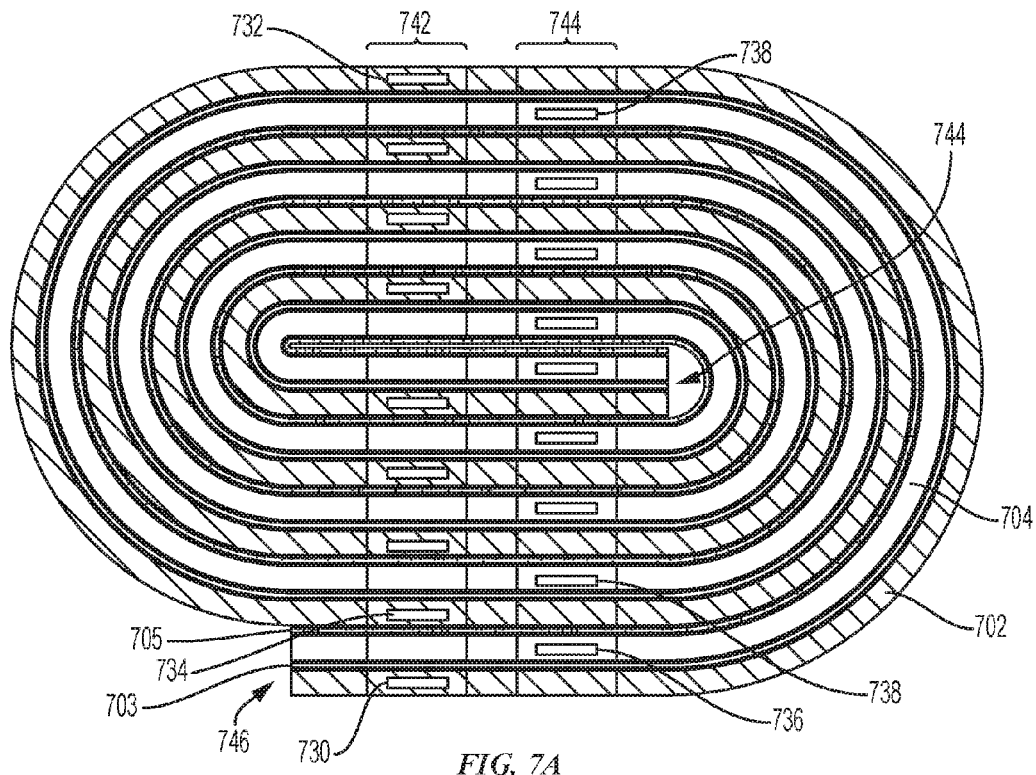
FIGS. 7A-B illustrate forming a jelly-roll having first and second notches from a cathode and anode in accordance with the disclosed embodiments.

FIG. 7A presents a side view of a jelly-roll, according to an illustrative embodiment. The jelly-roll includes a cathode layer 702 and an anode layer 704. The cathode layer 702 and the anode layer 704 may include, respectively, a cathode active coating disposed on a cathode current collector and an anode active coating disposed on an anode current collector. A first separator layer 703 is disposed between the cathode layer 702 and the anode layer 702, which may include being disposed between the cathode active coating and the anode active coating. A second separator layer 705 is disposed between the cathode layer 702 and the anode layer 704, which may include being disposed between the cathode current collector and the anode current collector.

The jelly-roll includes the common cathode notch 742 and the common anode notch 744. Individual cathode tabs (e.g., 730, 732, and 734) align within the common cathode notch 742 and may be coupled to the cathode current collector of the cathode layer 702. Similarly, individual anode tabs (e.g., 736, 738, and 740) align within the common anode notch 744 and may be coupled to the anode current collector of the anode layer 704. Multiple tabs can thereby be put within a common notch. FIG. 7A depicts one embodiment where multiple tabs are distributed across all available cathode and anode positions in, respectively, the common cathode notch 742 and the common anode notch 744. However, this depiction is not intended as limiting. Other distributions of tabs are possible, some embodiments of which, are described in relation to FIGS. 8A-8B and FIGS. 9A-9B.

Figure 7B:
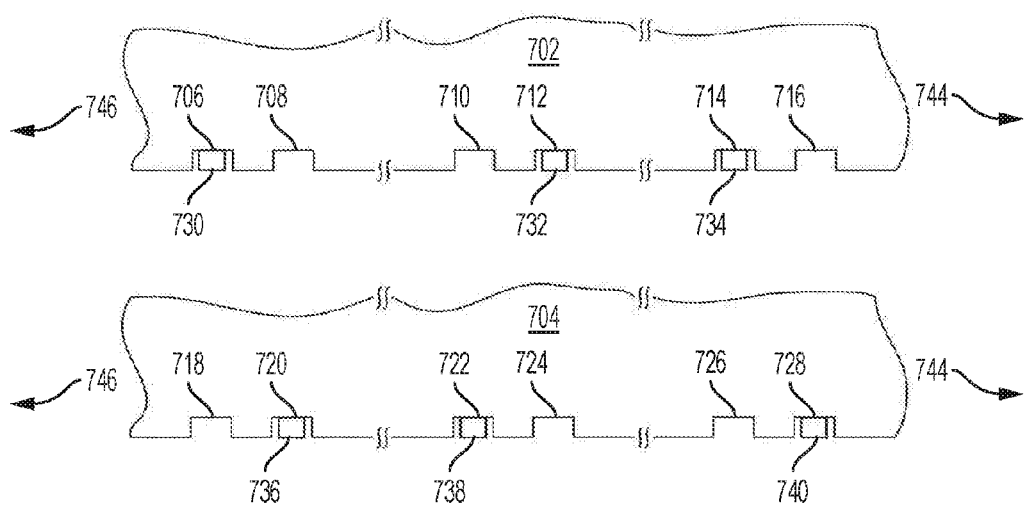

FIG. 7B illustrates a portion of the cathode layer 702 and a portion of the anode layer 704, but prior to winding into the jelly-roll. The cathode layer 702 includes cathode notch pairs along a cathode edge (i.e., notch pair 706, 708; notch pair 710, 712; and notch pair 714, 716). Similarly, the anode layer 704 includes anode notch pairs along an anode edge (i.e., notch pair 718, 720; notch pair 722, 724; and notch pair 726, 728). These notch pairs are arranged such that, when the cathode layer 702 stacks adjacent the anode layer 704, the cathode notch pairs will align with the anode notch pairs. The separator layers 703, 705 (not shown) also have notch pairs along their respective edges that match those of the cathode layer 702 and the anode layer 704. Thus, when the cathode layer 702, the first separator 703, the anode layer 704, and the second separator 705 are wound into the jelly roll, their respective notch pairs align to form the common cathode notch 742 and the common anode notch 744.

It will be appreciated that spacing between successive notch pairs increases when traversing a distance from an inner edge 744 of the jelly roll to an outer edge 746 of the jelly roll. Individual cathode tabs and individual anode tabs may be selectively positioned in, respectively, cathode notch pairs and anode notch pairs to produce distributions within the common cathode notch 742 and the common anode notch 744. FIG. 7B shows an alternating pattern of cathode tabs and anode tabs between successive notch pairs in, respectively, the cathode layer 702 and the anode layer 704. This alternating pattern results in a fully-populated cathode distribution within the common cathode notch 742 and a fully-populated anode distribution with the common anode notch 744, as shown in FIG. 7A.

The cathode layers 702 and the anode layers 704 of FIG. 7B may be manufactured using techniques described in relation to FIG. 6. These layers 702, 704 may then be incorporated into a stack that disposes the first separator layer 703 between the cathode layer 702 and the anode layer 704 and disposes the second separator layer 705 on an exposed surface of the anode layer 704. The stack may be wound into the jelly-roll illustrated in FIG. 7A.

Figure 8A:
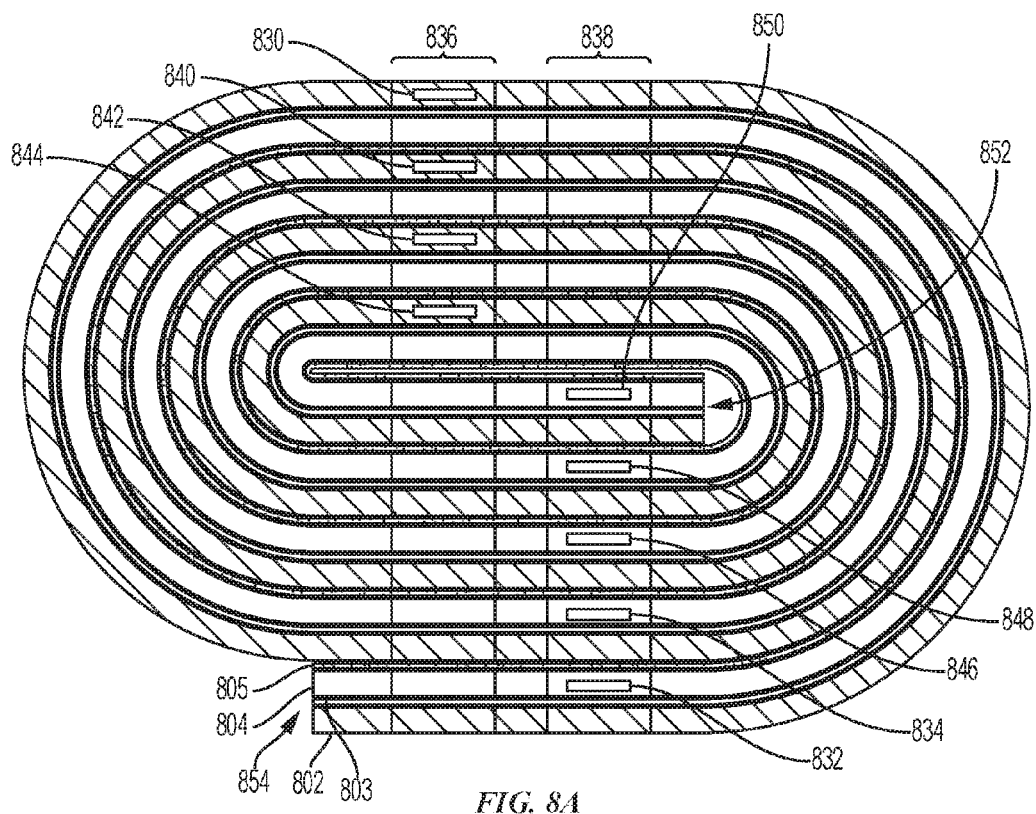
FIG. 8A presents a side view of a jelly-roll having cathode tabs and anode tabs on opposing portions of, respectively, a common cathode notch and a common anode notch, according to an illustrative embodiment.

FIG. 8A presents a side view of a jelly-roll having cathode tabs and anode tabs on opposing portions of, respectively, a common cathode notch and a common anode notch, according to an illustrative embodiment. The jelly-roll includes a cathode layer 802 and an anode layer 804. The cathode layer 802 and the anode layer 804 may include, respectively, a cathode active coating disposed on a cathode current collector and an anode active coating disposed on an anode current collector. A first separator layer 803 is disposed between the cathode layer 802 and the anode layer 804, which may include being disposed between the cathode active coating and the anode active coating. A second separator layer 805 is disposed between the cathode layer 802 and the anode layer 804, which may include being disposed between the cathode current collector and the anode current collector.

The jelly-roll includes the common cathode notch 836 and the common anode notch 838. Individual cathode tabs (e.g., 830, 840, 842, and 844) align within the common cathode notch 838 and may be coupled to the cathode current collector of the cathode layer 802. Similarly, individual anode tabs (e.g., 832, 834, 846, 848, and 850) align within the common anode notch 838 and may be coupled to the anode current collector of the anode layer 804. FIG. 8A depicts one embodiment where multiple tabs are distributed across cathode and anode positions in opposing portions of, respectively, the common cathode notch 836 and the common anode notch 838.

Figure 8B:
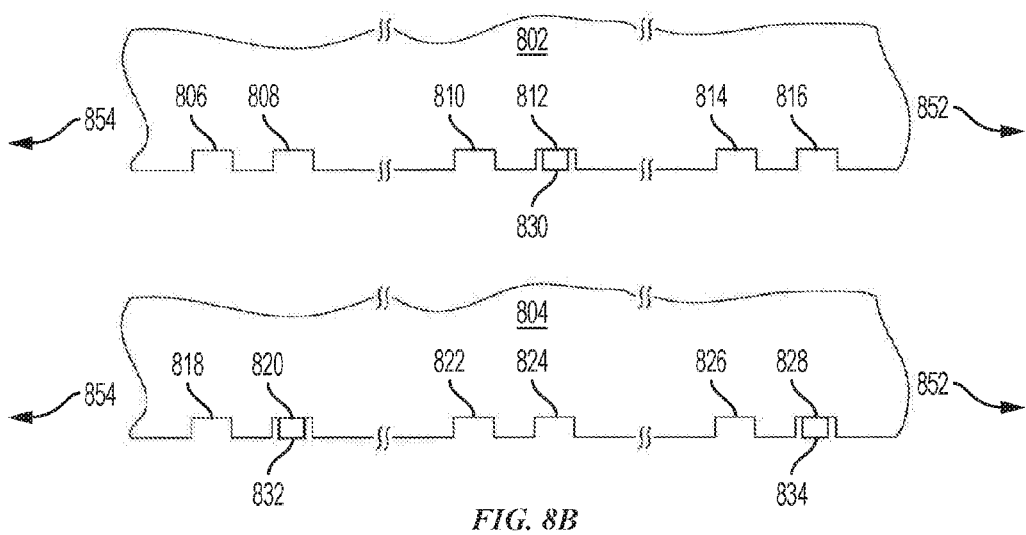
FIG. 8B illustrates portions of the cathode layer and the anode layer of FIG. 8A, but prior to winding into the jelly-roll.

FIG. 8B illustrates a portion of the cathode layer 802 and a portion of the anode layer 804, but prior to winding into the jelly-roll. The cathode layer 802 includes cathode notch pairs along a cathode edge (i.e., notch pair 806, 808; notch pair 810, 812; and notch pair 814, 816). Similarly, the anode layer 804 includes anode notch pairs along an anode edge (i.e., notch pair 818, 820; notch pair 822, 824; and notch pair 826, 828). These notch pairs are arranged such that, when the cathode layer 802 stacks adjacent the anode layer 804, the cathode notch pairs will align with the anode notch pairs. The separator layers 803, 805 (not shown) also have notch pairs along their respective edges that match those of the cathode layer 802 and the anode layer 804. Thus, when the cathode layer 802, the first separator 803, the anode layer 804, and the second separator 805 are wound into the jelly roll, their respective notch pairs align to form the common cathode notch 836 and the common anode notch 838.

It will be appreciated that spacing between successive notch pairs increases when traversing a distance from an inner edge 852 of the jelly roll to an outer edge 854 of the jelly roll. Individual cathode tabs and individual anode tabs may be selectively positioned in, respectively, cathode notch pairs and anode notch pairs to produce distributions within the common cathode notch 836 and the common anode notch 838. FIG. 8B shows a pattern of individual cathode tabs and individual anode tabs between successive notch pairs in, respectively, the cathode layer 802 and the anode layer 804. This pattern results in a partial distribution of cathode tabs within the common cathode notch 836 opposite a partial distribution of anode tabs with the common anode notch 838, as shown in FIG. 8A.

Figure 9A:
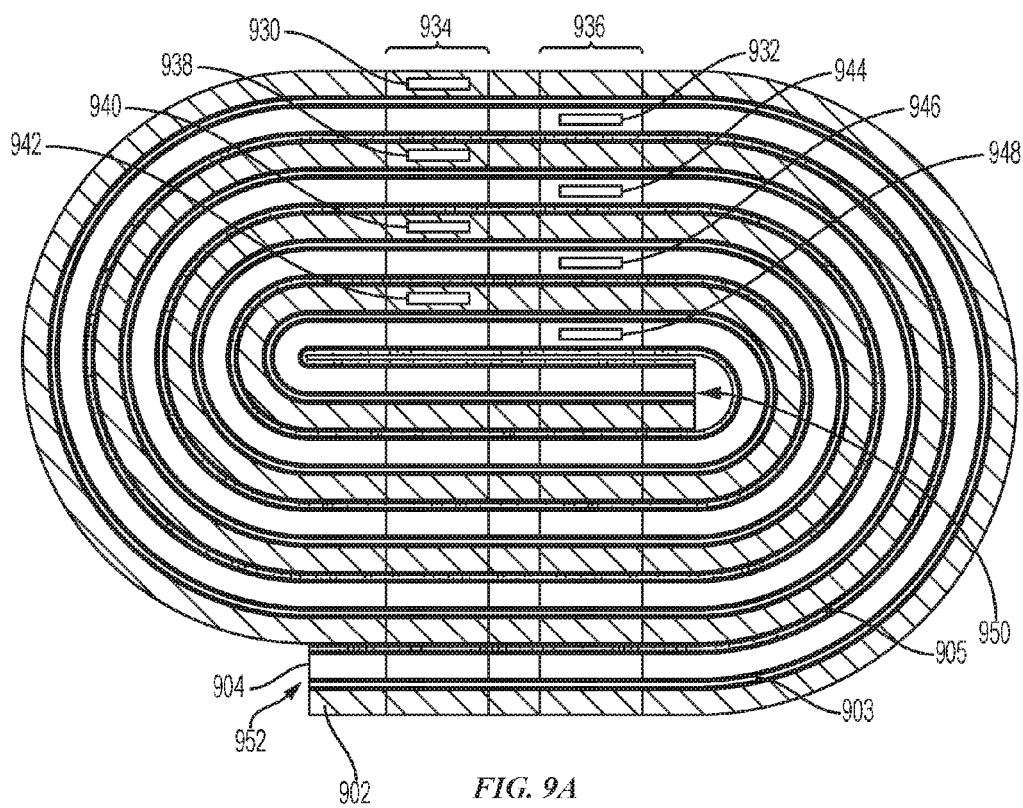
FIG. 9A presents a side view of a jelly-roll having cathode tabs and anode tabs on adjacent portions of, respectively, a common cathode notch and a common anode notch, according to an illustrative embodiment.

FIG. 9A presents a side view of a jelly-roll having cathode tabs and anode tabs on adjacent portions of, respectively, a common cathode notch and a common anode notch, according to an illustrative embodiment. The jelly-roll includes a cathode layer 902 and an anode layer 904. The cathode layer 902 and the anode layer 904 may include, respectively, a cathode active coating disposed on a cathode current collector and an anode active coating disposed on an anode current collector. A first separator layer 903 is disposed between the cathode layer 902 and the anode layer 904, which may include being disposed between the cathode active coating and the anode active coating. A second separator layer 905 is disposed between the cathode layer 902 and the anode layer 904, which may include being disposed between the cathode current collector and the anode current collector.

The jelly-roll includes the common cathode notch 934 and the common anode notch 936. Individual cathode tabs (e.g., 930, 938, 940, and 942) align within the common cathode notch 934 and may be coupled to the cathode current collector of the cathode layer 902. Similarly, individual anode tabs (e.g., 932, 944, 946, and 948) align within the common anode notch 936 and may be coupled to the anode current collector of the anode layer 904. FIG. 9A depicts one embodiment where multiple tabs are distributed across cathode and anode positions in adjacent portions of, respectively, the common cathode notch 934 and the common anode notch 936.

Figure 9B:
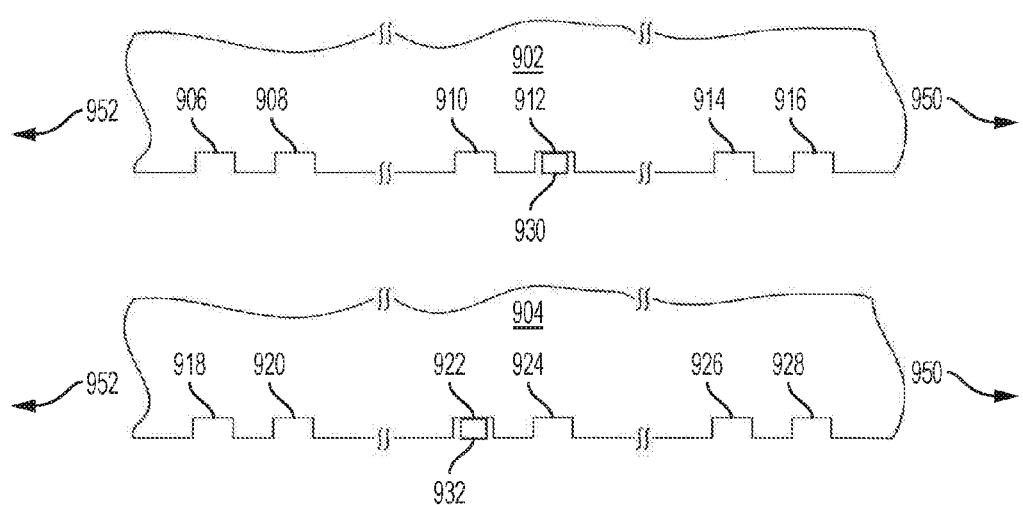
FIG. 9B illustrates portions of the cathode layer and the anode layer of FIG. 9A, but prior to winding into the jelly-roll.

FIG. 9B illustrates a portion of the cathode layer 902 and a portion of the anode layer 904, but prior to winding into the jelly-roll. The cathode layer 902 includes cathode notch pairs along a cathode edge (i.e., notch pair 906, 908; notch pair 910, 912; and notch pair 914, 916). Similarly, the anode layer 904 includes anode notch pairs along an anode edge (i.e., notch pair 918, 920; notch pair 922, 924; and notch pair 926, 928). These notch pairs are arranged such that, when the cathode layer 902 stacks adjacent the anode layer 904, the cathode notch pairs will align with the anode notch pairs. The separator layers 903, 905 (not shown) also have notch pairs along their respective edges that match those of the cathode layer 902 and the anode layer 904. Thus, when the cathode layer 902, the first separator 903, the anode layer 904, and the second separator 905 are wound into the jelly roll, their respective notch pairs align to form the common cathode notch 934 and the common anode notch 936.

It will be appreciated that spacing between successive notch pairs increases when traversing a distance from an inner edge 950 of the jelly roll to an outer edge 952 of the jelly roll. Individual cathode tabs and individual anode tabs may be selectively positioned in, respectively, cathode notch pairs and anode notch pairs to produce distributions within the common cathode notch 836 and the common anode notch 838. FIG. 9B shows a pattern of individual cathode tabs and individual anode tabs between successive notch pairs in, respectively, the cathode layer 902 and the anode layer 904. This pattern results in a partial distribution of individual cathode tabs within the common cathode notch 934 adjacent a partial distribution of individual anode tabs with the common anode notch 936, as shown in FIG. 9A.

Figure 10A:
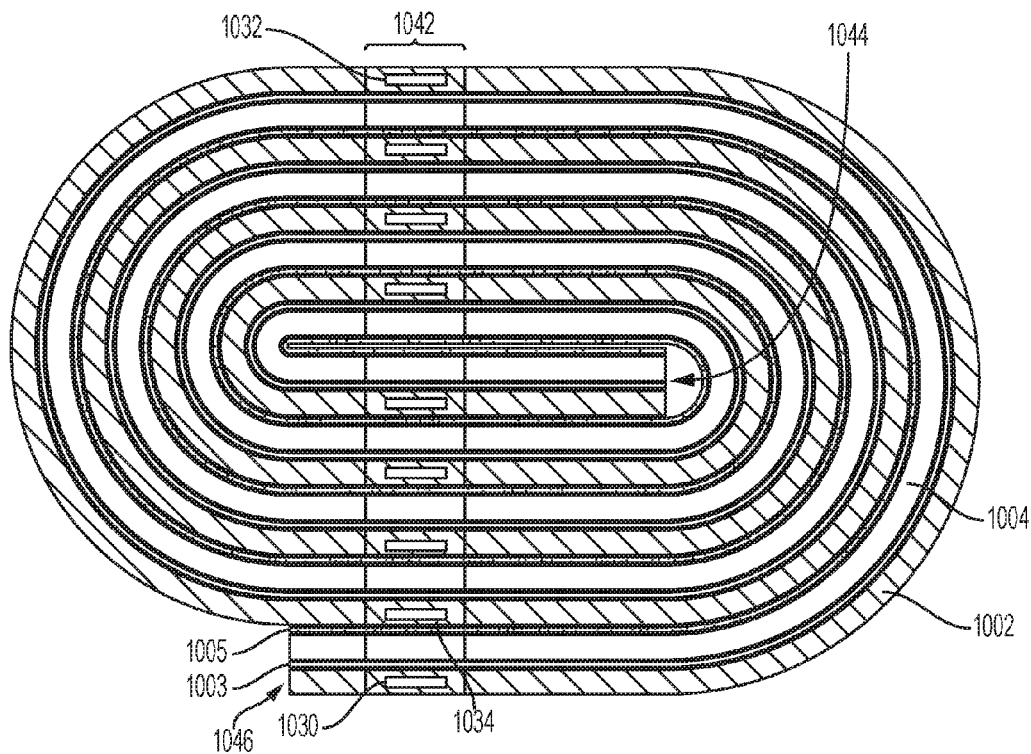
FIG. 10A presents a side view of a jelly-roll having a common cathode notch and a common anode notch on opposite sides and staggered relative to each other, according to an illustrative embodiment.

FIG. 10A presents a side view of a jelly-roll having a common cathode notch and a common anode notch on opposite sides and staggered relative to each other, according to an illustrative embodiment. A side having the common cathode notch 1042 is shown in FIG. 10A. The jelly-roll includes a cathode layer 1002 and an anode layer 1004. The cathode layer 1002 and the anode layer 1004 may include, respectively, a cathode active coating disposed on a cathode current collector and an anode active coating disposed on an anode current collector. A first separator layer 1003 is disposed between the cathode layer 1002 and the anode layer 1004, which may include being disposed between the cathode active coating and the anode active coating. A second separator layer 1005 is disposed between the cathode layer 1002 and the anode layer 1004, which may include being disposed between the cathode current collector and the anode current collector.

The jelly-roll includes the common cathode notch 1042 and the common anode notch (not shown). Individual cathode tabs (e.g., 1030, 1032, and 1034) align within the common cathode notch 1042 and may be coupled to the cathode current collector of the cathode layer 1002. Similarly, individual anode tabs align within the common anode notch and may be coupled to the anode current collector of the anode layer 1004. FIG. 10A depicts one embodiment where multiple tabs are distributed across all available cathode and anode positions in, respectively, the common cathode notch 1042 and the common anode notch.

Figure 10B:
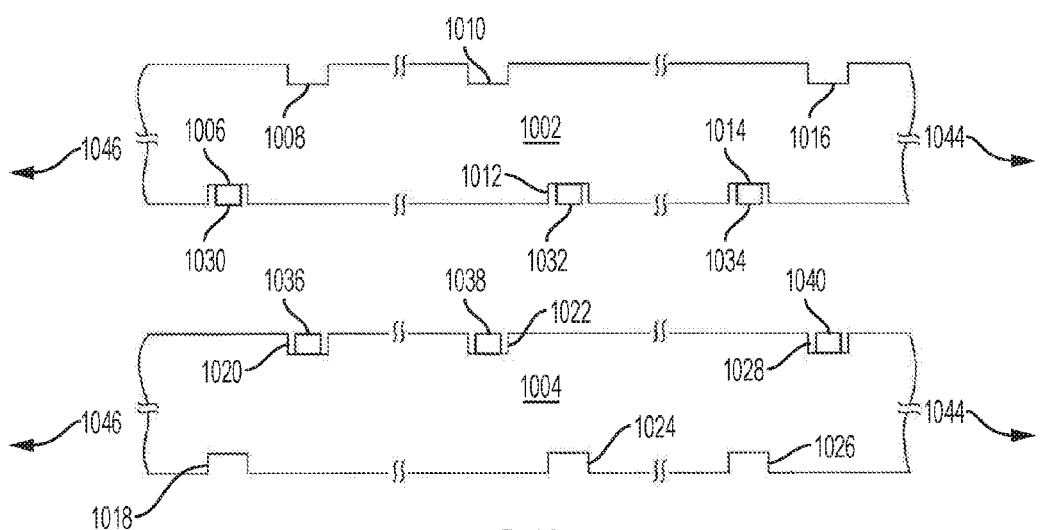
FIG. 10B illustrates portions the cathode layer and the anode layer of FIG. 10A, but prior to winding into the jelly-roll.

FIG. 10B illustrates a portion of the cathode layer 1002 and a portion of the anode layer 1004, but prior to winding into the jelly-roll. The cathode layer 1002 includes cathode notch pairs split along opposite cathode edges (i.e., notch pair 1006, 1008; notch pair 1010, 1012; and notch pair 1014, 1016). Similarly, the anode layer 1004 includes anode notch pairs split along opposite anode edges (i.e., notch pair 1018, 1020; notch pair 1022, 1024; and notch pair 1026, 1028). These notch pairs are arranged such that, when the cathode layer 1002 stacks adjacent the anode layer 1004, the cathode notch pairs will align with the anode notch pairs. The separator layers 1003, 1005 (not shown) also have notch pairs along their respective edges that match those of the cathode layer 1002 and the anode layer 1004. Thus, when the cathode layer 1002, the first separator 1003, the anode layer 1004, and the second separator 1005 are wound into the jelly roll, their respective notch pairs align to form the common cathode notch 1042 and the common anode notch.

It will be appreciated that spacing between successive notch pairs increases when traversing a distance from an inner edge 1044 of the jelly roll to an outer edge 1046 of the jelly roll. Individual cathode tabs and individual anode tabs may be selectively positioned in, respectively, cathode notch pairs and anode notch pairs to produce distributions within the common cathode notch 1042 and the common anode notch. FIG. 10B shows individual cathode tabs patterned along a cathode edge opposite that of individual anode tabs along an anode edge. This pattern results in a fully-populated cathode distribution within the common cathode notch 1042 and a fully-populated anode distribution with the common anode notch, as shown in FIG. 10A. However, these fully-populated distributions are on opposite sides of the jelly roll and staggered relative to each other.

Figure 11A:
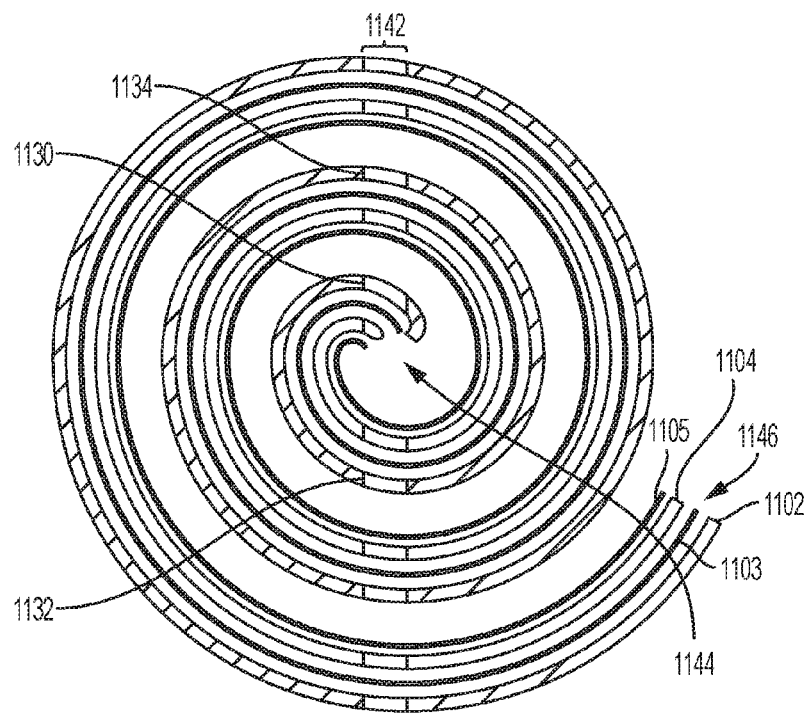
FIG. 11A presents a side view of a jelly-roll having a common cathode notch and a common anode notch on opposite sides and aligned relative to each other, according to an illustrative embodiment.

FIG. 11A presents a side view of a jelly-roll having a common cathode notch and a common anode notch on opposite sides and aligned relative to each other, according to an illustrative embodiment. A side having the common cathode notch 1142 is shown in FIG. 11A. The jelly-roll includes a cathode layer 1102 and an anode layer 1104. The cathode layer 1102 and the anode layer 1104 may include, respectively, a cathode active coating disposed on a cathode current collector and an anode active coating disposed on an anode current collector. A first separator layer 1103 is disposed between the cathode layer 1102 and the anode layer 1104, which may include being disposed between the cathode active coating and the anode active coating. A second separator layer 1105 is disposed between the cathode layer 1102 and the anode layer 1104, which may include being disposed between the cathode current collector and the anode current collector.

The jelly-roll includes the common cathode notch 1142 and the common anode notch (not shown). Individual cathode tabs (e.g., 1130, 1132, and 1134) align within the common cathode notch 1142 and may be coupled to the cathode current collector of the cathode layer 1102. Similarly, individual anode tabs align within the common anode notch and may be coupled to the anode current collector of the anode layer 1104. FIG. 11A depicts one embodiment where multiple tabs are distributed across all available cathode and anode positions in, respectively, the common cathode notch 1142 and the common anode notch.

Figure 11B:
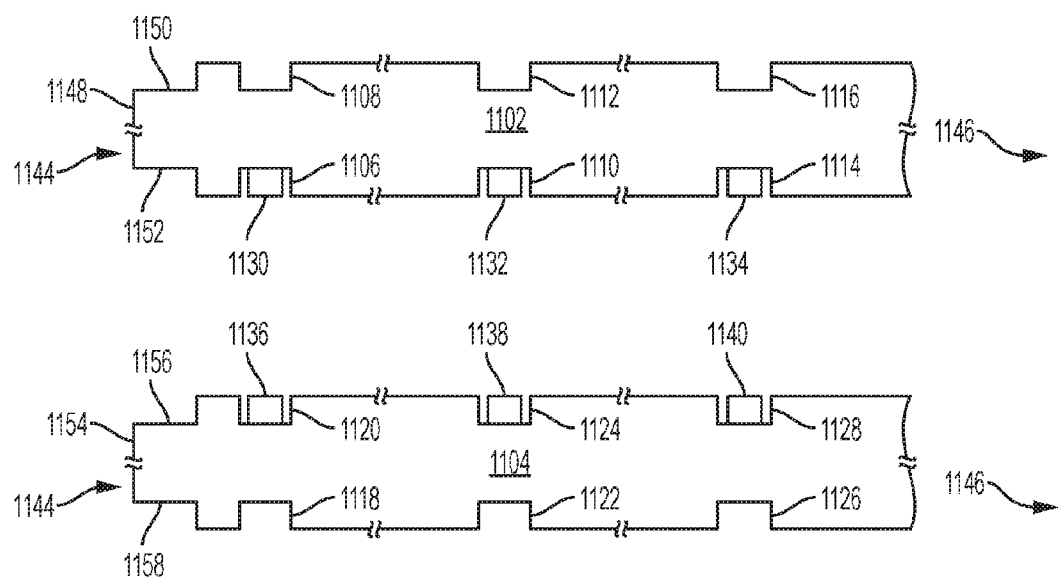
FIG. 11B illustrates portions of the cathode layer and the anode layer of FIG. 11A, but prior to winding into the jelly-roll.

FIG. 11B illustrates a portion of the cathode layer 1102 and a portion of the anode layer 1104, but prior to winding into the jelly-roll. The cathode layer 1102 includes cathode notch pairs split along opposite cathode edges (i.e., notch pair 1106, 1108; notch pair 1110, 1112; and notch pair 1114, 1116). Similarly, the anode layer 1104 includes anode notch pairs split along opposite anode edges (i.e., notch pair 1118, 1120; notch pair 1122, 1124; and notch pair 1126, 1128). These notch pairs are arranged such that, when the cathode layer 1102 stacks adjacent the anode layer 1104, the cathode notch pairs will align with the anode notch pairs. The separator layers 1103, 1105 (not shown) also have notch pairs along their respective edges that match those of the cathode layer 1102 and the anode layer 1104. Thus, when the cathode layer 1102, the first separator 1103, the anode layer 1104, and the second separator 1105 are wound into the jelly roll, their respective notch pairs align to form the common cathode notch 1142 and the common anode notch.

It will be appreciated that spacing between successive notch pairs increases when traversing a distance from an inner edge 1144 of the jelly roll to an outer edge 1146 of the jelly roll. Individual cathode tabs and individual anode tabs may be selectively positioned in, respectively, cathode notch pairs and anode notch pairs to produce distributions within the common cathode notch 1142 and the common anode notch. FIG. 11B shows individual cathode tabs patterned along a cathode edge opposite that of individual anode tabs. This pattern results in a fully-populated cathode distribution within the common cathode notch 1142 and a fully-populated anode distribution with the common anode notch, as shown in FIG. 11A. However, these fully-populated distributions are on opposite sides of the jelly roll and aligned relative to each other.

Further, it will be appreciated that a center portion of a jelly roll battery cell may be so tightly wound that protrusion of cathode layer 1102 and anode layer 1104 into the center portion interferes with electrode tabs when connected. To mitigate this interference, the cathode layer 1102 may utilize a notch pair adjacent an inner cathode edge 1148. Notches 1150 and 1152 extend from the inner cathode edge 1148 along a first predetermined length. The first predetermined length is selected by those skilled in the art to mitigate interference in the center portion. Similarly, anode layer 1104 utilizes a notched pair adjacent an inner anode edge 1154. Notches 1156 and 1158 extend from the inner anode edge 1154 along a second predetermined length. The second predetermined length need not be equivalent to the first predetermined length.

In FIGS. 1A-3D and 4A-11B, notches in the jelly-roll have been depicted as sharing a common size. However, this depiction is for purposes of illustration only. Notches of the cathode layers, the anode layers, and the separator layers may vary in size.

Figure 12A:
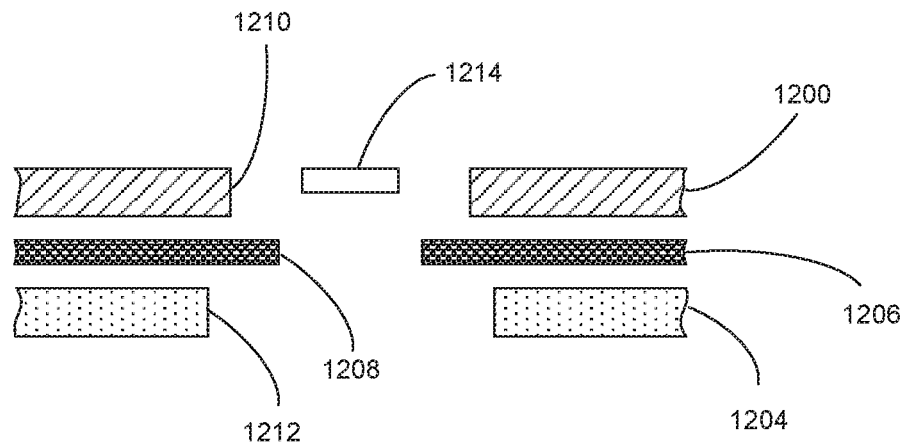
FIGS. 12A-B illustrate notches of varying size in each of the cathode and anode layers.
Figure 12B:
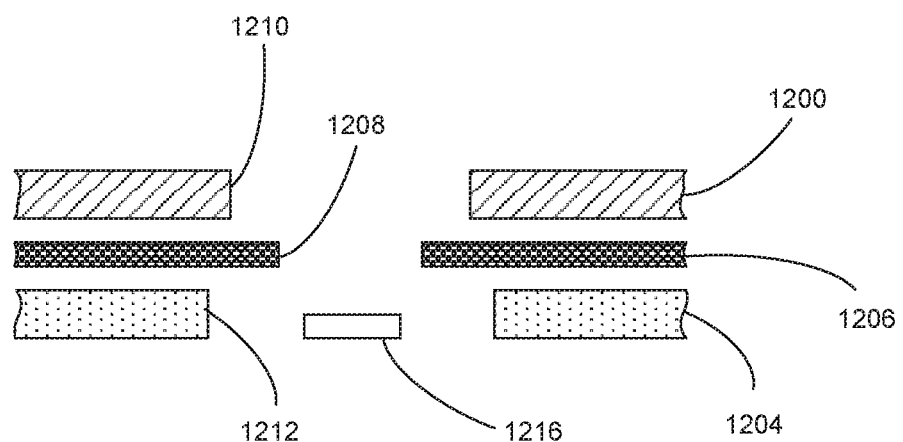

FIGS. 12A & 12B illustrate notches in a cathode layer 1200, a separator layer 1202, and an anode layer 1204, but where notches in each layer differ in size. More specifically, a separator notch 1208 is smaller in width than a cathode notch 1210 or an anode notch 1212, creating an overhang. Additionally or alternatively, the cathode notch 1210 may be smaller in width than the anode notch 1212 (or in some instances, the anode notch 1212 may be smaller in width than the cathode notch 1210). In combination, such distribution of notch sizes may reduce a risk of short-circuiting between the cathode layer 1200 and the anode layer 1204 (i.e., during operation). FIG. 12A depicts the notches 1208-1212 in a context of a cathode tab 1214 and FIG. 12B depicts the notches 1208-1212 in the context of an anode tab 1216.

Computing Device

Figure 13:
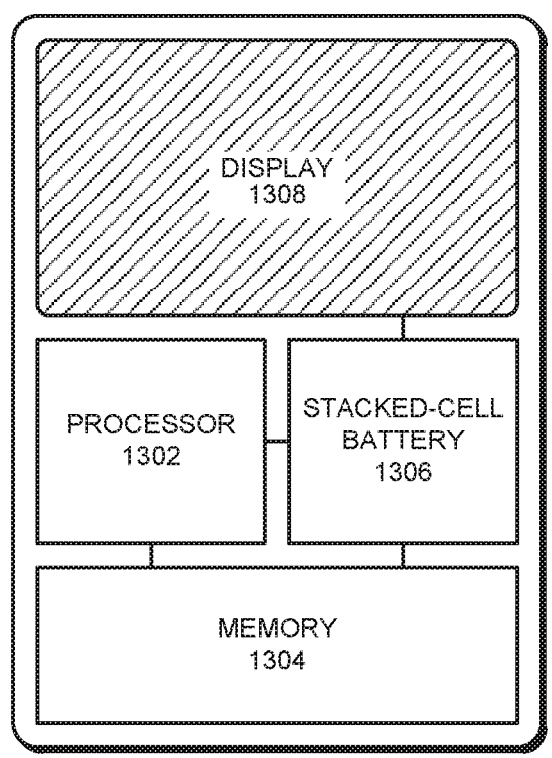
FIG. 13 presents a schematic diagram of a portable electronic device that includes one or more battery cells having a set of layers in a wound configuration.

The above-described rechargeable battery cell can generally be used in any type of electronic device. For example, FIG. 13 illustrates a portable electronic device 1300, which includes a processor 1302, a memory 1304 and a display 1308, which are all powered by a battery 1306. Portable electronic device 1300 may correspond to a laptop computer, mobile phone, tablet computer, portable media player, digital camera, and/or other type of battery-powered electronic device. Battery 1306 may correspond to a battery pack that includes one or more battery cells. Each battery cell may include a set of layers in a wound configuration, i.e., a jelly-roll battery cell, that are sealed in a pouch. The jelly-roll battery cell includes a cathode, a coated separator, an anode, and/or a binder coating.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A battery cell, comprising:
   a jelly-roll comprising wound-together layers, the layers comprising a cathode layer, an anode layer, and one or more separator layers disposed between each cathode layer and anode layer;
   a first common notch and a second common notch formed along at least one side of the jelly-roll;
   an uncoated cathode tab extending from at least one cathode layer in the first common notch;
   a first end notch extending from an end of the at least one cathode layer to a first length along an edge of the at least one cathode layer;
   an uncoated anode tab extending from at least one anode layer in the second common notch;
   a second end notch extending from an end of the at least one anode layer to a second length along an edge of the at least one anode layer;
   a common cathode tab bonded to each uncoated cathode tab within the first common notch; and
   a common anode tab bonded to each uncoated anode tab within the second common notch.

2. The battery cell of claim 1, further comprising a pouch enclosing the jelly-roll, wherein the common anode tab and the common cathode tab extend through the pouch to provide, respectively, an anode terminal and a cathode terminal for the battery cell.

3. The battery cell of claim 1, wherein a bond between the common cathode tab and each uncoated cathode tab comprises folded-and-bonded cathode tabs that are bonded to the common cathode tab.

4. The battery cell of claim 1, wherein a bond between the common anode tab and the each uncoated anode tab comprises folded-and-bonded anode tabs that are bonded to the common anode tab.

5. The battery cell of claim 1, wherein the first common notch and the second common notch are positioned on a same side of the battery cell.

6. The battery cell of claim 1, wherein the first common notch and the second common notch are positioned on opposite sides of the battery cell.

7. The battery cell of claim 1, wherein either of the first common notch and the second common notch comprises a contained notch that is contained within a side of the battery cell.

8. The battery cell of claim 1, further comprising a hole in an interior region of the battery cell extending though the wound-together layers of the jelly-roll.

9. A method for manufacturing a battery cell, comprising:
   cutting a plurality of anode notch pairs into an anode layer, the anode layer comprising an anode current collector coated with an anode active coating;
   cutting an end notch into the anode layer, the end notch extending from an end of the anode layer to a first length along an edge of the anode layer;
   cutting a plurality of cathode notch pairs into a cathode layer, the cathode layer comprising a cathode current collector coated with a cathode active coating;
   cutting an end notch into the cathode layer, the end notch extending from an end of the cathode layer to a first length along an edge of the cathode layer;
   cutting a plurality of separator notch pairs into one or more separator layers;
   ablating the anode active coating from an anode region associated with an anode tab thereby forming the anode tab;

ablating the cathode active coating from a cathode region associated with a cathode tab thereby forming the cathode tab;

winding the cathode layer, the anode layer, and the one or more separator layers to form a jelly-roll comprising a first common notch and a second common notch; and wherein the plurality of anode notch pairs, the plurality of cathode notch pairs, and the plurality of separator notch pairs are arranged along, respectively, the anode layer, the cathode layer, and the one or more separator layers so that the jelly roll, when wound, forms the first common notch and the second common anode notch along at least one side.

10. The method of claim 9, further comprising bonding the cathode tab to a common cathode tab within the first common notch, bonding the anode tab to a common anode tab within the second common notch.

11. The method of claim 9, further comprising bonding each cathode tab to a common cathode tab extending from the battery cell;

bonding each anode tab to a common anode tab extending from the battery cell.

12. The method of claim 11, further comprising placing the jelly-roll in a pouch such that the common anode and cathode tabs extend through openings in the pouch to provide corresponding anode and cathode terminals for the battery cell.

13. The method of claim 9, wherein the cathode active coating of each cathode layer and the anode active coating of each anode layer is ablated prior to cutting the anode and cathode layers.

14. The method of claim 9, wherein the cathode active coating of each cathode layer and the anode active coating of each anode layer is ablated after cutting the anode and cathode layers.

15. The method of claim 11, wherein bonding each cathode tab to the common cathode tab comprises:

folding the cathode tabs;

bonding the folded cathode tabs together; and bonding the common cathode tab to the folded-and-bonded cathode tabs.

16. The method of claim 11, wherein bonding the anode tabs to the common anode tab comprises:

folding the anode tabs;

bonding the folded anode tabs together; and bonding the common anode tab to the folded-and-bonded anode tabs.

17. The method of claim 9, wherein the first and second common notches are formed on a same side of the battery cell.

18. The method of claim 9, wherein the first and second common notches are formed on opposite sides of the battery cell.

19. The method of claim 9, wherein the first and second common notches comprise a contained notch that is contained within a side of the battery cell.

20. The method of claim 9, wherein at least one of the first and second common notches comprises a hole in an interior region of the battery cell extending though the layers of the jelly-roll; and wherein a corresponding conductive tab extends into the hole.

21. A portable computing device, comprising:

a processor;

a memory;

a display; and a battery cell comprising a jelly-roll comprising wound together layers, the layers comprising a cathode layer, an anode layer, and one or more separator layers disposed between each cathode layer and anode layer;

a first common notch and second common notch formed along at least one side of the jelly-roll;

an uncoated cathode tab extending from at least one cathode layer in the first common notch;

a first end notch extending from an end of the at least one cathode layer to a first length along an edge of the at least one cathode layer;

an uncoated anode tab extending from at least one anode layer in the second common notch;

a second end notch extending from an end of the at least one anode layer to a second length along an edge of the at least one anode layer;

a common cathode tab bonded to each uncoated cathode tab within the first common notch; and a common anode tab bonded to each uncoated anode tab within the second common notch.

* * * * *